United States Patent
McBurney et al.

(10) Patent No.: US 7,415,353 B2
(45) Date of Patent: Aug. 19, 2008

(54) SATELLITE-POSITION TABLE MESSAGING

(75) Inventors: Paul W. McBurney, San Francisco, CA (US); Frederic Vaucher, San Francisco, CA (US)

(73) Assignees: Seiko Epson Corporation, Tokyo (JP); eRide, Inc., San Francisco, CA (US)

( * ) Notice: Subject to any disclaimer, the term of this patent is extended or adjusted under 35 U.S.C. 154(b) by 803 days.

(21) Appl. No.: 10/853,691

(22) Filed: May 25, 2004

(65) Prior Publication Data

US 2005/0278116 A1 Dec. 15, 2005

(51) Int. Cl.
*G01S 5/14* (2006.01)
(52) U.S. Cl. .................................. 701/213; 342/358
(58) Field of Classification Search .......... 701/213, 701/214, 215; 342/357.01, 357.02, 357.03, 342/357.1, 357.06, 357.12, 358
See application file for complete search history.

(56) References Cited

U.S. PATENT DOCUMENTS

| | | | | |
|---|---|---|---|---|
| 6,112,054 A | * | 8/2000 | Kita | 455/12.1 |
| 6,127,967 A | * | 10/2000 | Ghazvinian et al. | 342/354 |
| 6,400,319 B1 | * | 6/2002 | Castelloe et al. | 342/457 |
| 7,064,706 B2 | * | 6/2006 | King et al. | 342/357.02 |
| 2004/0263386 A1 | * | 12/2004 | King et al. | 342/357.06 |

\* cited by examiner

*Primary Examiner*—Dalena Tran
(74) *Attorney, Agent, or Firm*—Mark P. Watson

(57) ABSTRACT

A navigation satellite receiver accepts satellite-position table messages comprising truncated GPS ephemeris parameters. In particular, at least one of the two harmonic corrections to inclination angle, Cic and Cis, are not communicated and not used in the solution of navigation receiver position. In a first method embodiment of the present invention, both the two harmonic corrections to inclination angle, Cic and Cis, are omitted from the computation. In a second method embodiment of the present invention, only one of the two harmonic corrections to inclination angle, Cic and Cis, are omitted from the computation, depending on Min($C_{is}$ sin($2\phi_k$), $C_{is}$ cos($2\phi_k$)).

8 Claims, 2 Drawing Sheets

SATELLITE-POSITION TABLE MESSAGING

FIELD OF THE INVENTION

The present invention relates to navigation satellite receivers, and more particularly to methods and systems for operating navigation satellite receivers with less than a full ephemeris almanac.

DESCRIPTION OF THE PRIOR ART

The global positioning system (GPS) is a satellite-based radio-navigation system built and operated by the United States Department of Defense at a cost of over $13 billion. Satellite positioning systems (SPS) include GPS and the Russian GLONASS navigation system. Others are proposed by Japan and the European Union.

In the GPS system, twenty-four satellites circling the earth at an attitude of 20,200 km are spaced in orbit such that a minimum of six satellites are in view at any one time to a user. Each such satellite transmits an accurate time and position signal. GPS receivers measure the time delay for the signal to reach it, and the apparent receiver-satellite distance is calculated from that. Measurements like this from at least four satellites allow a GPS receiver to calculate its three-dimensional position, velocity, and system time.

The solution to the receiver position depends on knowing where each of the relevant satellites are in three-dimensional space. The respective positions are reported as parameters belonging to a set of equations. In conventional GPS systems, the GPS ephemeris includes all the items in the following table, Table I.

TABLE I

GPS Ephemeris Message

| Name | Symbol |
|---|---|
| Reference time of ephemeris | toe |
| Square root of semi major axis | $\sqrt{a}$ |
| Eccentricity | e |
| Inclination angle (at time toe) | i0 |
| Longitude of ascending node | $\Omega 0$ |
| Argument or perigee (at time toe) | $\omega$ |
| Mean anomaly (at time toe) | M0 |
| Rate of change of inclination angle | di/dt |
| Rate of change of Longitude of ascending node | $\Omega$ |
| Mean motion correction | $\Delta n$ |
| Amplitude of cosine correction to argument of latitude | Cuc |
| Amplitude of sine correction to argument of latitude | Cus |
| Amplitude of cosine correction to orbital radius | Crc |
| Amplitude of sine correction to orbital radius | Crs |
| Amplitude of cosine correction to inclination angle | Cic |
| Amplitude of sine correction to inclination angle | Cis |

During the period of validity of the ephemeris message, it is possible to compute the near exact position and velocity of a satellite at any one instant in its flight using the complete GPS ephemeris message information downloaded to the navigation receiver. The present inventors have observed that the computed position of a satellite is very sensitive to small variations of most of these parameters, so it is necessary to fully communicate them during each ephemeris download. But, it has also been observed by them that the two harmonic corrections to inclination angle, Cic and Cis, are not so critical. What is needed is a GPS receiver and system that can ignore at least one of these two parameters in the computation of a satellite position, and do it with little degradation in the solution accuracy.

One of the present inventors, Paul McBurney, together with some others, have recently filed several United States Patent Applications that relate to embodiments of the present invention and in general to aiding GPS receiver clients. These are summarized in Table II. All such patent applications have been assigned to the same Assignee, and are incorporated herein by reference.

TABLE II

| Title | Inventors | USPTO Filing Date | USPTO Serial No. |
|---|---|---|---|
| Satellite Navigation satellite receiver and Method of | P. McBurney, A. Woo | 11 Oct. 2000 | 09/687,044 |
| Infrastructure-Aiding for Satellite Navigation satellite receiver and Method | P. McBurney, A. Woo | 28 Feb. 2001 | 09/797,521 |
| High sensitivity GPS Receiver and Reception | P. McBurney, A. Woo | 19 Feb. 2002 | 10/079,245 |
| Total Correction Strategy | Stephen J, Edwards, P. McBurney | 19 Feb. 2002 | 10/079,217 |
| Method and System for Position Calculation from Calculated Time | S. Edwards, P. McBurney | 19 Feb. 2002 | 10/079,244 |
| Computing Network Path Delays so Accurate Absolute Time can be Forwarded from a Server to a Client | H. Matsushita, P. McBurney | 19 Feb. 2002 | 10/079,251 |
| No Preamble Frame Sync | Akira Kimura, P. McBurney | 19 Feb. 2002 | 10/079,250 |
| Thin Client | P. McBurney, C. Rasmussen, F. Vaucher, K. Victa | 19 Feb. 2002 | 10/079,249 |
| Software Crystal Oscillator | H. Matsushita, P. McBurney | 19 Feb. 2002 | 10/079,248 |
| High Sensitivity Infrequent Use of Sensors | P. McBurney, K. Victa | 19 Feb. 2002 | 10/079,247 |
| Real Time Clock (RTC) | P. McBurney | 19 Feb. 2002 | 10/079,253 |
| Shared Reference Station | C. Rypinski, M. Junkar | 19 Feb. 2002 | 10/079,252 |
| Client-Aided Doppler Estimation | P. McBurney, W. J. Morrison | 07 Aug. 2002 | 10/215,138 |
| Synthetic Nav-Data For A High-Sensitivity Satellite Positioning System Receiver | P. McBurney, W. J. Morrison | not yet filed | |

The GPS satellites transmit a 50-bps navigation (NAV) data message that repeats every 12.5 minutes. It comprises system time, satellite ephemeris, and almanac information that is critical to a GPS receiver in acquiring signal lock on enough satellites and producing its navigation solutions. There are twenty-five frames that each take 30-seconds, each frame has five subframes, and each subframe hasten words. A Z-count at the beginning of each subframe gives its transmission time from the satellite. Ephemeris is the first three subframes, and subframes 4-5 are almanac data spread over fifty pages. One whole data frame of NAV data is 1500-bits long, and thus takes thirty seconds to transmit.

SUMMARY OF THE INVENTION

Briefly, a navigation satellite receiver embodiment of the present invention accepts satellite-position table messages comprising truncated GPS ephemeris parameters. In particular, at least one of the two harmonic corrections to inclination angle, Cic and Cis, are not communicated and not used in the solution of navigation receiver position. In a first method embodiment of the present invention, both the two harmonic corrections to inclination angle, Cic and Cis, are omitted from the computation. In a second method embodiment of the present invention, only one of the two harmonic corrections to inclination angle, Cic and Cis, are omitted from the computation, depending on $Min(C_{is} \sin(2\phi_k), C_{ic} \cos(2\phi_k))$.

An advantage of the present invention is that a system and method is provided for a navigation receiver to operate accurately with less than a full ephemeris for any particular GPS satellite.

These and other objects and advantages of the present invention will no doubt become obvious to those of ordinary skill in the art after having read the following detailed description of the preferred SPS-receivers which are illustrated in the various drawing figures.

IN THE DRAWINGS

DETAILED DESCRIPTION OF THE PREFERRED EMBODIMENT

Figure 1:
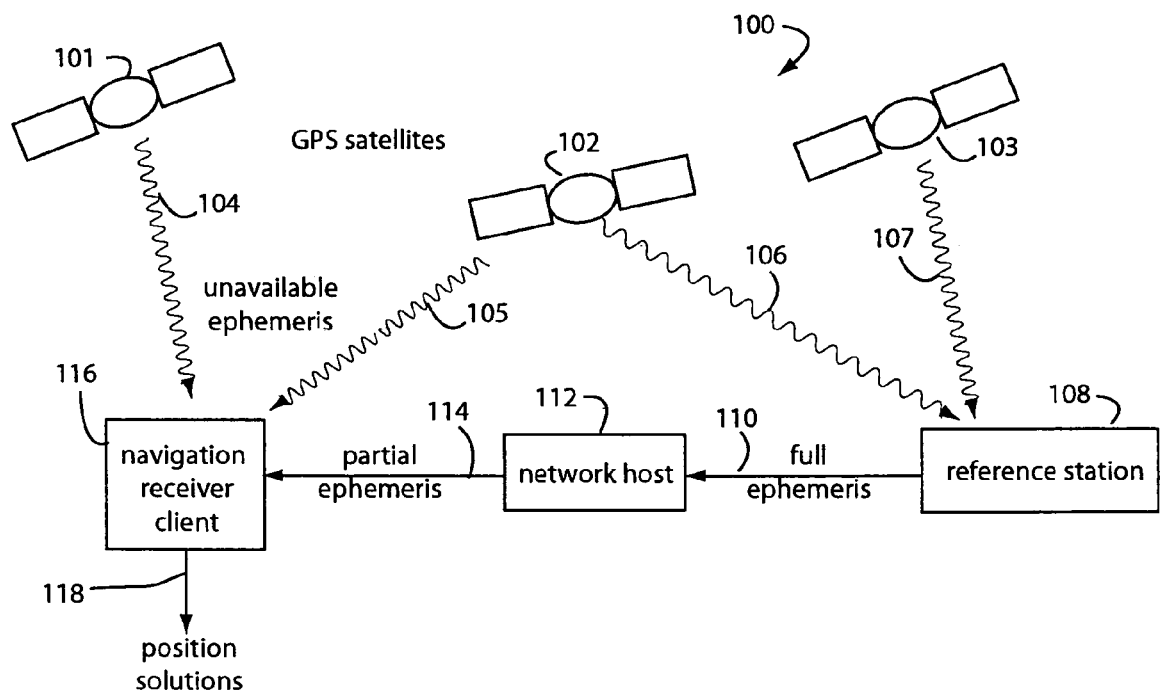
FIG. 1 is a functional block diagram of a networked navigation system embodiment of the present invention.

FIG. 1 illustrates a satellite navigation receiver system embodiment of the present invention, and is referred to herein by the general reference numeral 100. The system 100 uses a constellation of visible GPS satellite vehicles (SV's) 101-103 to compute the pseudoranges of microwave signals 104-107. A reference station 108 receives such transmissions, represented by signals 106 and 107, and acquires the full almanac and ephemeredes for the SV's 101-103. A full ephemeris 110 is thus forwardable to a network host 112 for distribution, e.g., on the Internet. A partial ephemeris, e.g., a satellite-position table message 114, is broadcast or requested from a navigation receiver client 116. Such satellite-position table message 114 lacks, in a first method embodiment of the present invention, both the two harmonic corrections to inclination angle, Cic and Cis. See Table III. So these two parameters are omitted from the usual computation by setting them to zero. In a second method embodiment of the present invention, only one of the two harmonic corrections to inclination angle, Cic and Cis, is omitted from the computation, depending on $Min(C_{is} \sin(2\phi_k), C_{ic} \cos(2\phi_k))$. A position solution 118 is output that is only insignificantly degraded from the more ideal where all the ephemeris parameters are on-hand and used in the position solution.

TABLE III

GPS Ephemeris Message

| Name | Symbol |
|---|---|
| Reference time of ephemeris | toe |
| Square root of semi major axis | $\sqrt{a}$ |
| Eccentricity | e |
| Inclination angle (at time toe) | i0 |
| Longitude of ascending node | Ω0 |
| Argument of perigee (at time toe) | ω |
| Mean anomaly (at time toe) | M0 |
| Rate of change of inclination angle | di/dt |
| Rate of change of Longitude of ascending node | Ω |
| Mean motion correction | Δn |
| Amplitude of cosine correction to argument of latitude | Cuc |
| Amplitude of sine correction to argument of latitude | Cus |
| Amplitude of cosine correction to orbital radius | Crc |
| Amplitude of sine correction to orbital radius | Crs |
| Amplitude of cosine correction to inclination angle | Cic |
| Amplitude of sine correction to inclination angle | Cis |

The reason the navigation receiver client 116 needs any help at all with the ephemeris and almanac collection at all is microwave signals 104 and 105 may be too weak for its radio receiver to gather anything more than pseudorange information. The NAV-message maybe too hard to collect, e.g., as can happen if the receiver antenna is indoors or otherwise blocked from the sky.

The satellite-position table message 114 may be provided for several business purposes, e.g., to avoid patent infringements, to collect subscription revenues, to support a private fleet, as a public service, etc.

Figure 2:
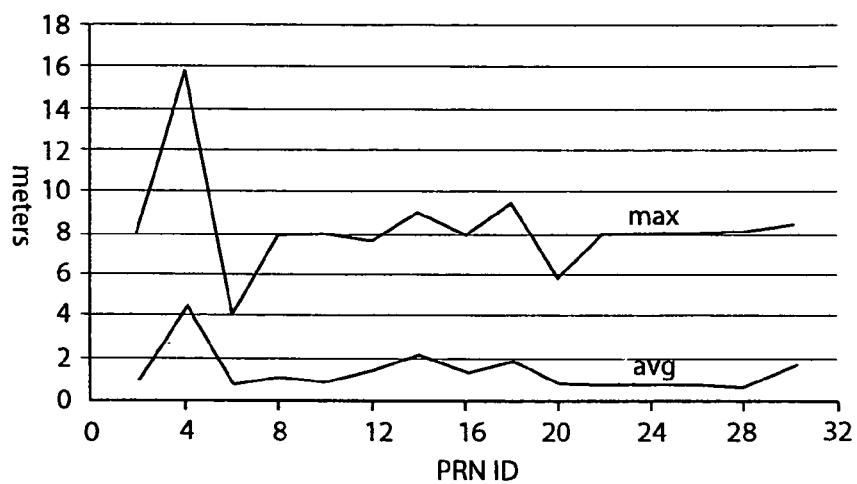
FIG. 2 is a graph representing the errors that were computed when using a first method embodiment of the present invention that omits two parameters, Cic and Cis, from the position solution computation.

A first method embodiment of the present invention comprises the omitting both the Cic and Cis parameters in the communication to the receiver and the computation of its position solution. FIG. 2 represents a graph of the position errors for fifteen satellites computed over one year of data sampled every hour, where Cis=0 and Cic=0. The average error computed was only a few meters for each satellite.

Figure 3:
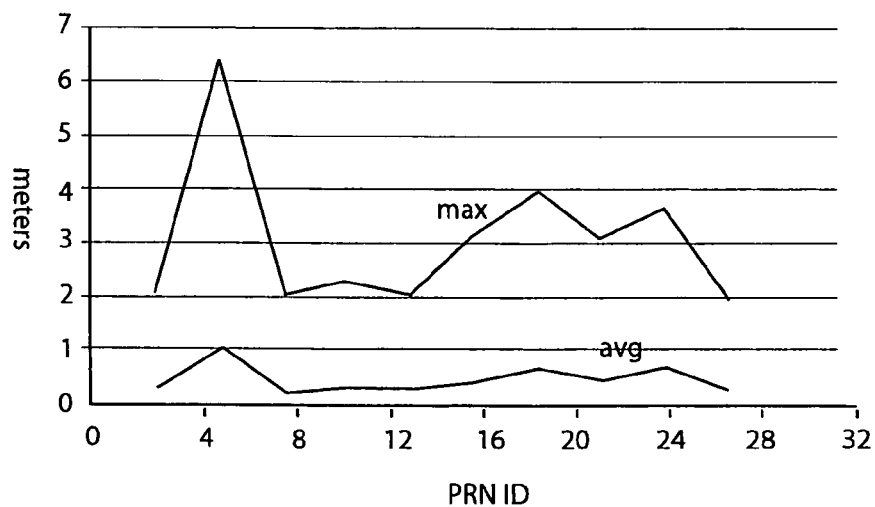
FIG. 3 is a graph representing the errors that were computed when using a second method embodiment of the present invention that omits one of parameters, Cic and Cis, from the position solution computation.

A second method embodiment of the present invention omits only one of the two parameters, e.g., the one that has the smallest effect on the position. The inclination correction is $\Delta = C_{is} \sin(2\phi_k) + C_{ic} \cos(2\phi_k)$, where $\phi_k$ is the argument of latitude, one of Cis or Cic is omitted depending on $Min(C_{is} \sin(2\phi_k), C_{ic} \cos(2\phi_k))$. FIG. 3 represents the position error computed for ten satellites using such method. The average error is reduced about four fold when only one of the parameters is omitted in the computation, e.g., the position solution error is less than one meter.

Figure 4:
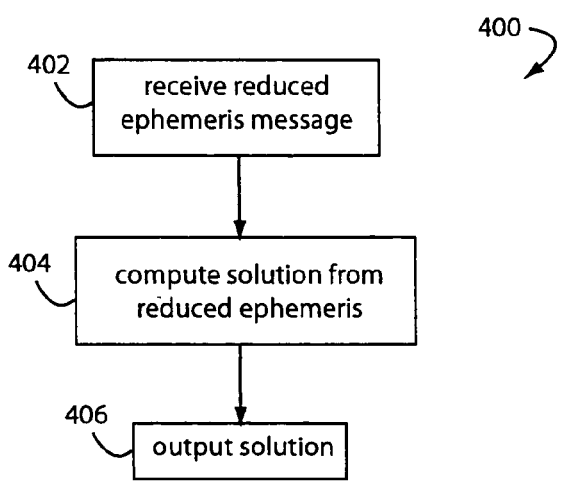
FIG. 4 is a flowchart of a method embodiment of the present invention.

FIG. 4 represents a generalized method embodiment of the present invention, and is referred to herein by the general reference numeral 400. The method 400 comprises a step 402 of receiving a reduced ephemeris message in which either or both of the two harmonic corrections to inclination angle, Cic and Cis, have not been sent or are set to zero. Such step can be preconditioned by having paid a subscription fee and access is via the Internet. A step 404 computes a position solution from such reduced ephemeris. Such step is necessary because the local receiver doing the computation cannot obtain its own copy of the ephemeris directly, e.g., the antenna is indoors and the signal strength is too weak. A step 406 outputs the position solution and is accurate, e.g., to within one meter of precision over time. In an alternative embodiment of method 400, the step 402 has both Cis and Cic missing or set to zero. The resulting error occurring with step 406 is nevertheless within acceptable limits of the application made by the user.

Although the present invention has been described in terms of the presently preferred SPS receivers, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A method of operating a navigation receiver, comprising:
   whenever a navigation receiver has ephemeris information unavailable to it directly from orbiting navigation satellites because of weak signal conditions, then:
   accepting a partial-ephemeris in a satellite-position table message from a network host that lacks at least one of the two harmonic corrections to inclination angle, Cic and Cis, of the flight trajectory of a particular orbiting navigation satellite, wherein said network host has stripped out such data from a complete almanac collected by a reference station at another location;
   computing a position solution using said reduced ephemeris information from said satellite-position table message; and
   outputting said position solution with an accuracy degraded due to having omitted either of said two harmonic corrections to inclination angle, Cic and Cis, in the step of computing.

2. The method of claim 1, wherein:
   the step of receiving is such that both of said two harmonic corrections to inclination angle, Cic and Cis, are missing and set to zero.

3. The method of claim 1, wherein:
   the step of receiving is such that a fee is charged to receive such satellite-position table message.

4. The method of claim 1, wherein:
   the step of receiving is such that said satellite-position table message is provided over an Internet connection from a reference station and network host.

5. A method of operating a navigation receiver, comprising:
   receiving from an information source, other than an orbiting navigation satellite, a satellite-position table message that is the equivalent of the ephemeris for a particular satellite lacking at least one of the two harmonic corrections to inclination angle, Cic and Cis;
   computing a position solution using said reduced ephemeris information from said satellite-position table message; and
   outputting said position solution with an accuracy degraded less than a meter by having omitted either of said two harmonic corrections to inclination angle, Cic and Cis, in the step of computing;
   wherein, the step of computing is such that the one of the two harmonic corrections to inclination angle, Cic and Cis,
   which is omitted from the computation, can be mathematically expressed as depending on $\text{Min}(C_{is} \sin(2\phi_k), C_{ic} \cos(2\phi_k))$.

6. A navigation receiver client, comprising:
   an input for receiving an information source, other than an orbiting navigation satellite, a satellite-position table message that is the equivalent of the ephemeris for a particular satellite lacking at least one of the two harmonic corrections to inclination angle, Cic and Cis;
   a radio for receiving microwave transmissions and measuring pseudoranges from orbiting satellite vehicles in which their respective data related to their ephemerides is unobtainable; and
   a position solution output in which a position solution is determined from said pseudoranges and said satellite-position table message with at least one of the two harmonic corrections to inclination angle, Cic and Cis, set to zero;
   wherein, a navigation receiver can continue to operate when ephemeris information directly from orbiting navigation satellites is unavailable to it because of weak signal conditions.

7. The navigation receiver client of claim 6, wherein:
   the input receives information obtained over the Internet for a fee.

8. The navigation receiver client of claim 6, wherein:
   the input is such that said satellite-position table message is provided over an Internet connection from a reference station and network host.

* * * * *